US010507705B2

United States Patent
Lee et al.

(10) Patent No.: US 10,507,705 B2
(45) Date of Patent: Dec. 17, 2019

(54) TRIPLE-ZONE HVAC APPARATUS FOR AUTOMOTIVE VEHICLE

(71) Applicants: Hyundai Motor Company, Seoul (KR); Kia Motors Corporation, Seoul (KR)

(72) Inventors: Yoon-Hyung Lee, Seoul (KR); Byeong-Moo Jang, Suwon-si (KR); Myung-Hun Kang, Jeonju-si (KR); Jong-Sik Bae, Suwon-si (KR); Chul-Min Jang, Asan-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 133 days.

(21) Appl. No.: 15/799,894

(22) Filed: Oct. 31, 2017

(65) Prior Publication Data

US 2018/0162191 A1 Jun. 14, 2018

(30) Foreign Application Priority Data

Dec. 14, 2016 (KR) ........................ 10-2016-0170744

(51) Int. Cl.
*B60H 1/00* (2006.01)
(52) U.S. Cl.
CPC ..... *B60H 1/00064* (2013.01); *B60H 1/00842* (2013.01); *B60H 2001/002* (2013.01); *B60H 2001/00192* (2013.01)
(58) Field of Classification Search
CPC ............ B60H 1/00064; B60H 1/00685; B60H 1/00842; B60H 1/00678; B60H 1/00028; B60H 1/00; B60H 1/0005; B60H 1/00021; B60H 2001/00135; B60H 2001/00192; B60H 2001/002
See application file for complete search history.

(56) References Cited

U.S. PATENT DOCUMENTS

| | | | | |
|---|---|---|---|---|
| 6,048,263 | A * | 4/2000 | Uchida | B60H 1/00064 165/204 |
| 2003/0205370 | A1* | 11/2003 | Kim | B60H 1/00064 165/204 |
| 2007/0266726 | A1* | 11/2007 | Tada | B60H 1/00064 62/331 |
| 2009/0117841 | A1* | 5/2009 | Goto | B60H 1/00064 454/127 |
| 2009/0250193 | A1* | 10/2009 | Ishikawa | B60H 1/00028 165/61 |
| 2016/0039261 | A1* | 2/2016 | Akahane | B60H 1/00528 165/203 |

FOREIGN PATENT DOCUMENTS

KR  2001-0108763 A  12/2001

* cited by examiner

*Primary Examiner* — Emmanuel E Duke
(74) *Attorney, Agent, or Firm* — Morgan, Lewis & Bockius LLP

(57) ABSTRACT

A triple-zone heating, ventilation and air conditioning (HVAC) apparatus for an automotive vehicle may be configured to mix cold air passing through an evaporator and warm air passing through a heat exchanger with each other and blow the mixed air to a front seat foot vent through a front seat foot door and to a rear seat vent through a rear seat door.

17 Claims, 7 Drawing Sheets

TRIPLE-ZONE HVAC APPARATUS FOR AUTOMOTIVE VEHICLE

CROSS-REFERENCE(S) TO RELATED APPLICATIONS

The present application claims priority to Korean Patent Application No. 10-2016-0170744, filed on Dec. 14, 2016, the entire contents of which is incorporated herein for all purposes by this reference.

BACKGROUND OF THE INVENTION

Field of the Invention

The present invention relates to a heating, ventilation and air conditioning (HVAC) apparatus disposed in an automotive vehicle, and more particularly, to an HVAC apparatus configured for controlling triple zones in the vehicle individually.

Description of Related Art

The HVAC apparatus refers to an apparatus for maintaining conditions such as temperature, humidity, etc. of a room in a proper state. Automotive vehicles are equipped with an air conditioner for cooling, heating and ventilation. The term "heating, ventilation and air conditioning (HVAC) apparatus" refers to such an air conditioner.

Such an HVAC apparatus performs its function by repeating processes of compressing, condensing, expanding, and evaporating a refrigerant by a compressor configured to compress, a condenser configured to condense, an evaporator configured to evaporate, etc.

A conventional HVAC apparatus for an automotive vehicle adopted a single-zone control system which controls the overall interior of the vehicle at a single temperature, or a dual-zone control system which controls temperature of a driver seat side and temperature of a passenger seat side independently. In recent years, a triple-zone control system for controlling temperature of a rear seat side of the vehicle as well individually has been researched and developed.

Figure 1:
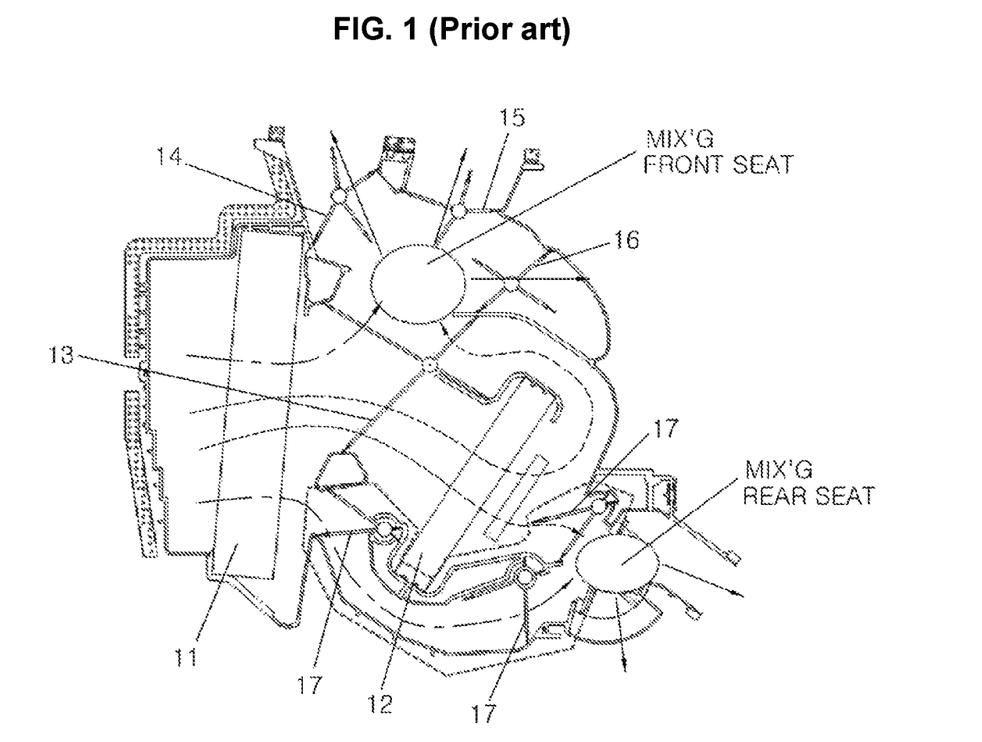
FIG. 1 and FIG. 2 show a triple-zone HVAC apparatus according to the prior art.

FIG. 1 shows an example of a triple-zone control system.

This is a single mixing type in that the air for the front seat and the rear seat of the vehicle passes through one mixing zone.

In the present HVAC apparatus, when the air cooled by an evaporator 11 passes through a heat exchanger 12 under the control of a temperature door 13, the air becomes heated, whereas when the air cooled by the evaporator does not pass through the heat exchanger, the air maintains its cool temperature. In addition, it is possible to control the temperature to a desired temperature by allowing cold air and hot air to be mixed in a mixing zone according to degree of openness of the temperature door 13.

The air directed to the front seat side is expelled to a defrost vent, a face vent and a foot vent through a mixing zone for the front seat wherein the defrost vent, the face vent and the foot vent are controlled by a defrost door 14, a face door 15 and a foot door 16 respectively.

In addition, the air directed to the rear seat side is expelled to a rear seat vent through a mixing zone for the rear seat. The above is controlled by a rear seat door 17.

In the triple-zone HVAC apparatus in the present example, a structure of the lower area shown as a bold dotted line is added to control the air directed to the rear seat side, resulting in the addition of three rear seat doors and two actuators for controlling the doors.

As a result, size and manufacturing cost of the apparatus are increased.

Figure 2:
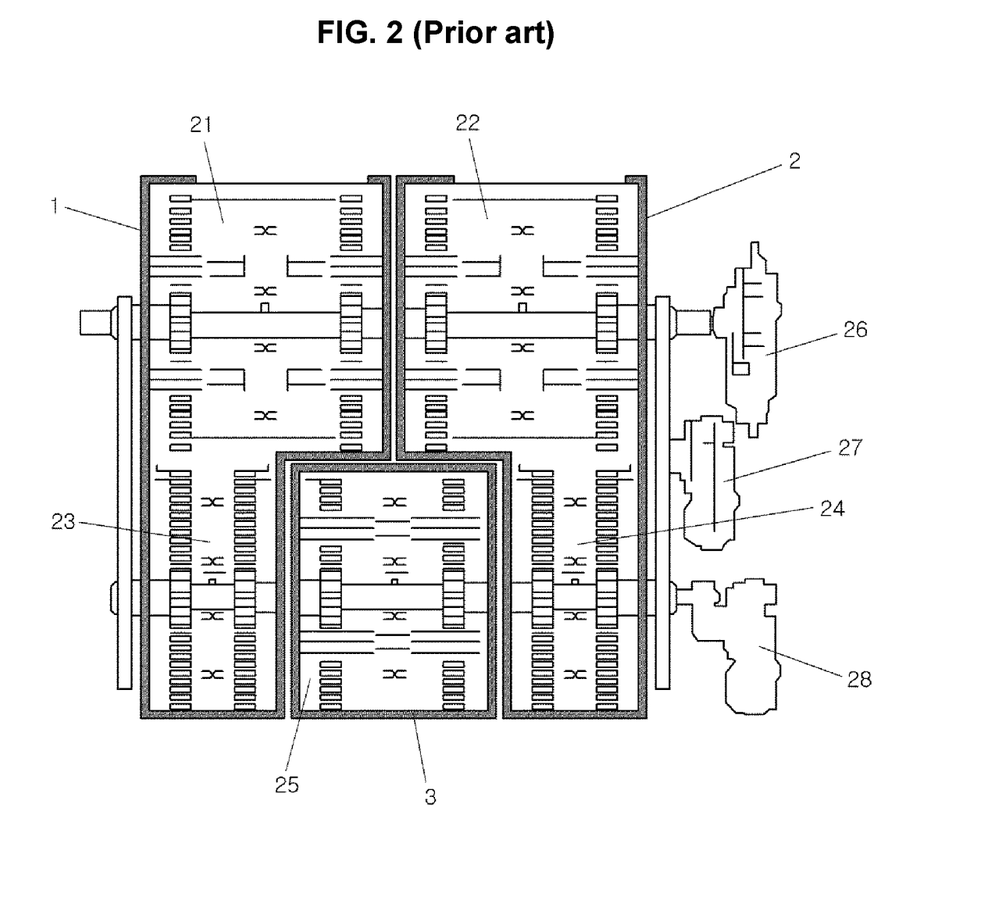

FIG. 2 shows an example of an up and down mixing type triple-zone HVAC apparatus, schematically illustrating a front view in a direction of blowing the air.

The present case is an apparatus of which a blowing zone is divided into zones 1, 2 and 3 wherein the zone 1 corresponds to a zone of the driver seat and is controlled by opening and closing a driver seat face door 21 at an upper side and a driver seat foot door 23 at a lower side; while the zone 2 is controlled by opening and closing a passenger seat face door 22 at the upper side and a passenger seat foot door 24 at the lower side.

The zone 3 is controlled by opening and closing a rear seat door 25 as a zone of a rear seat.

Each of the doors illustrated is controlled in such a manner that warm air is blown when a central side is opened whereas cold air is blown when the door is opened upwardly and downwardly.

The above corresponds to an apparatus in which flow paths are simplified compared to the apparatus shown in FIG. 1, but requires five doors for three-zone control and three actuators for controlling doors in the zones 1, 2 and 3.

That is, one door and one actuator are additionally required and a structure for various links is additionally required, with the result that the structure is complicated and the cost is increased.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a heating, ventilation and air conditioning (HVAC) apparatus for an automotive vehicle which has a simplified structure and a reduction in cost while achieving triple-zone control.

In accordance with an aspect of the present invention, there is provided an HVAC apparatus for an automotive vehicle, wherein the apparatus is configured to mix cold air passing through an evaporator and warm air passing through a heat exchanger with each other, and blow the mixed air to a front seat foot vent through a front seat foot door and to a rear seat vent through a rear seat door.

Further, an upper and lower partition wall for dividing an internal volume into an upper volume and a lower volume to divide a flow path into an upper flow path and a lower flow path is formed.

The upper and lower partition wall is formed at a height at which the heat exchanger is bisected.

Further, flow paths to the front seat foot vent and the rear seat vent are formed in the lower volume defined by the upper and lower partition wall.

Further, the front seat foot vent includes a foot vent at a driver seat side and a foot vent at a passenger seat side wherein the flow path to the rear seat vent is disposed below the flow path to the front seat foot vent.

The flow path to the front seat foot vent is formed in one volume of the internal volumes bisected vertically.

Further, one volume among the internal volumes bisected vertically, in which a flow path to the front seat foot vent is not formed, is closed.

Further, the flow path to the rear seat vent is formed in one volume of the internal volumes bisected vertically.

Further, one volume among the internal volumes bisected vertically, in which a flow path to the rear seat vent is not formed, is closed.

Further, the flow path to the front seat foot vent and the flow path to the rear seat vent do not overlap vertically.

Therefore, the front seat foot door and the rear seat door are controlled separately by actuators disposed at the driver seat side and the passenger seat side respectively.

Further, the apparatus further includes a sub-door disposed in the upper flow path defined by the upper and lower partition wall configured to guide warm air in the upper flow path to the front seat foot vent.

The sub-door is disposed at a rear end portion of the heat exchanger and is provided at a lower side of a front seat face door for controlling the blowing of air to the front seat face vent through the upper flow path.

Further, the sub-door includes a sub-door at the driver seat side and a sub-door at the passenger seat side.

In accordance with another aspect of the present invention, there is provided an HVAC apparatus for an automotive vehicle wherein an internal volume vertically bisected into a driver seat side and a passenger seat side and divided into upper and lower volumes is formed, a flow path to a front seat face vent is formed in the upper volume, a flow path to a front seat foot vent and a flow path to a rear seat vent are formed to be divided vertically in the lower volume, and the flow paths to the front seat foot vent and the rear seat vent are formed in one volume of the volumes bisected vertically.

Further, the flow path to the front seat foot vent and the flow path to the rear seat vent do not overlap vertically.

As a result, a front seat foot door for controlling the flow path to the front seat foot vent and a rear seat foot door for controlling the flow path to the rear seat vent are controlled by separate actuators.

Further, the apparatus further includes a sub-door provided in the upper volume to guide warm air in the upper volume to the front seat foot vent.

The sub-door is disposed at a rear end portion of a heat exchanger provided in the upper volume, and is provided at a lower side of a front seat face door for controlling blowing of air to the front seat face vent.

Further, the sub-door includes a sub-door at the driver seat side and a sub-door at the passenger seat side.

According to the triple-zone HVAC apparatus for an automotive vehicle of the present invention, the number of doors and actuators can be reduced so that structure can be simplified and hence the cost can be reduced, and it is advantageous in terms of the size compared to the conventional apparatus.

Nevertheless, the present invention is efficient because there is no shortage in controlling triple zones.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description Is not intended to limit the invention(s) to those exemplary embodiments. On the contrary, the invention(s) is intended to cover not only the exemplary embodiments, but also various alternatives, modifications, equivalents and other embodiments, which may be included within the spirit and scope of the invention as defined by the appended claims.

In describing the exemplary embodiments, a detailed description of technology known in the art or iterative description may be made shortly or omitted to avoid obscuring the subject matter of the present invention.

Figure 3:
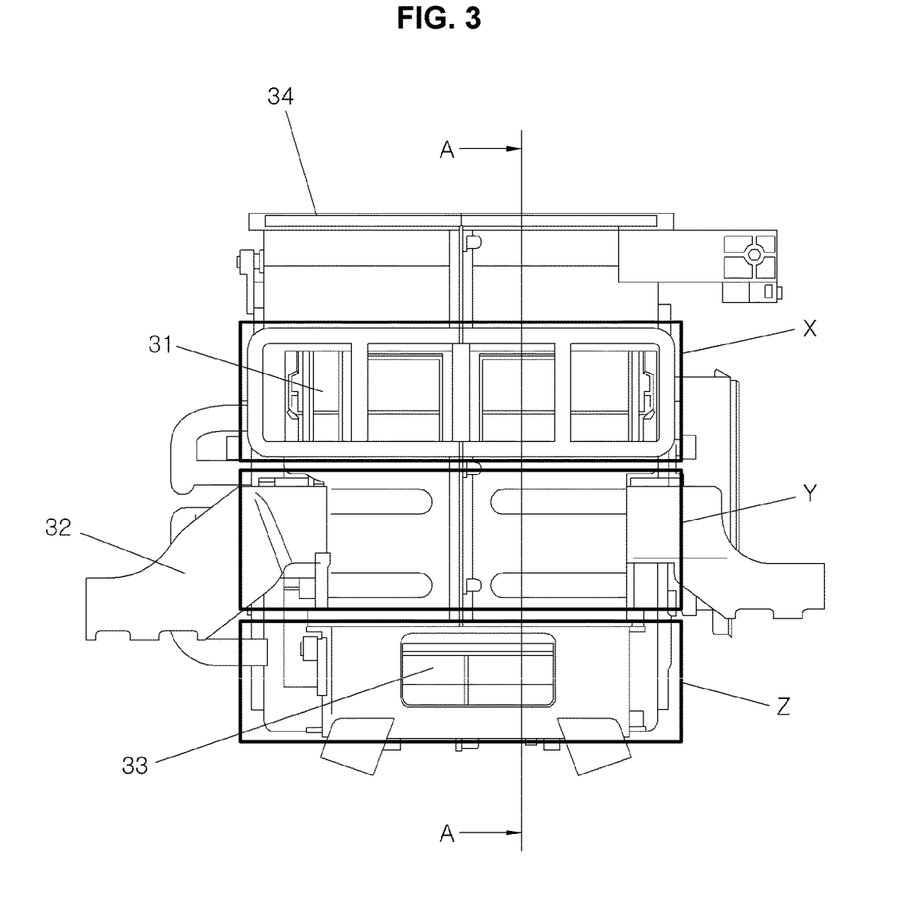
FIG. 3 is a schematic view of an HVAC apparatus for an automotive vehicle according to an exemplary embodiment of the present invention.
Figure 4:
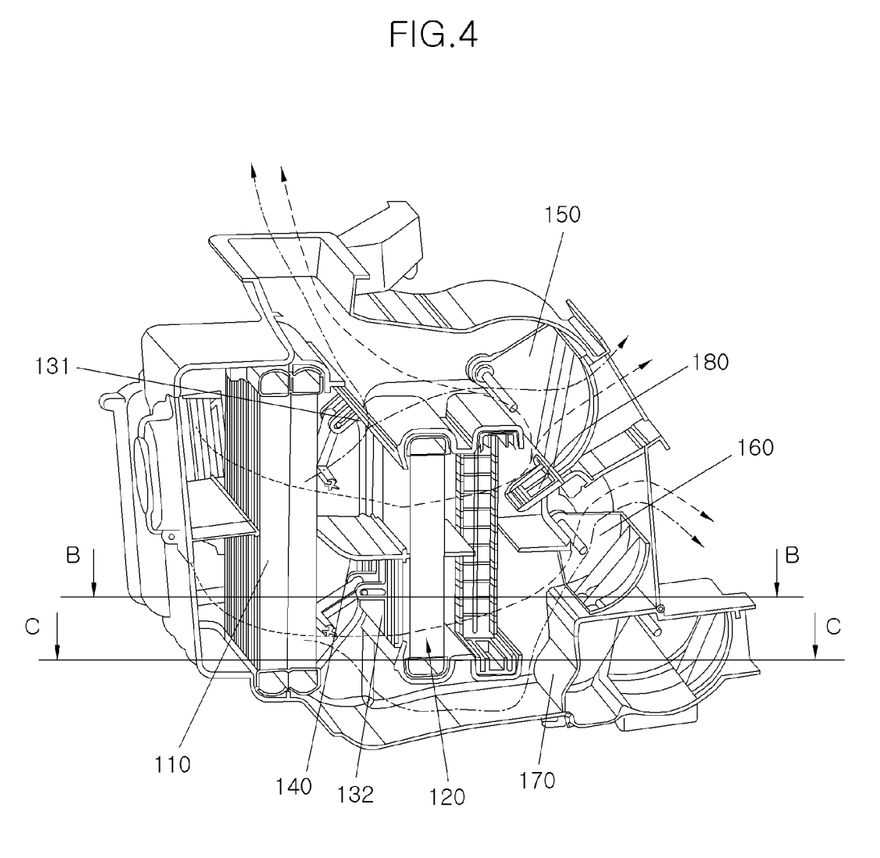
FIG. 4 illustrates a cross section taken along line A-A of FIG. 3.
Figure 5:
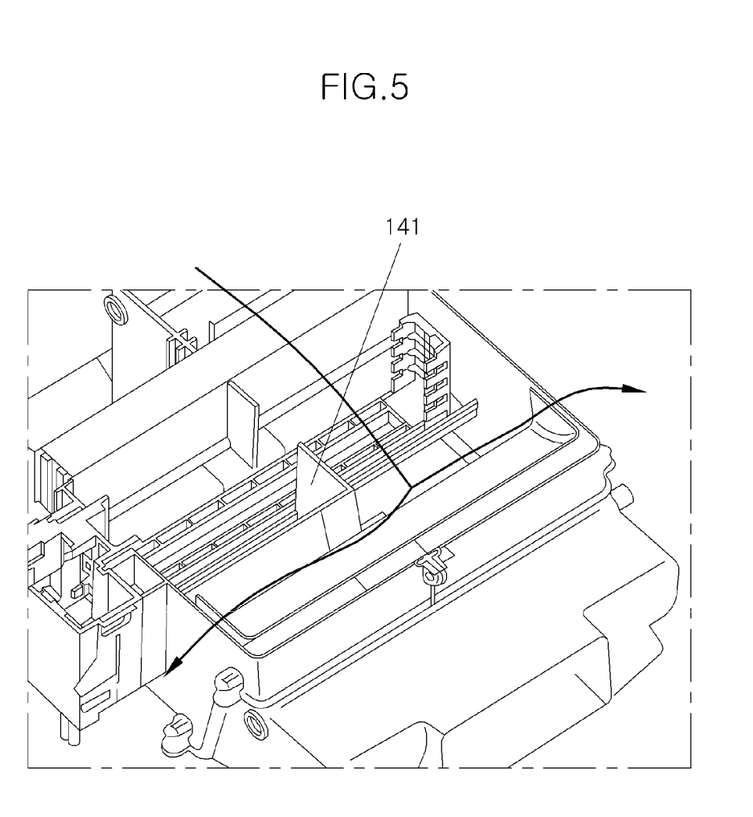
FIG. 5 illustrates a cross section taken along line B-B of FIG. 4.
Figure 6:
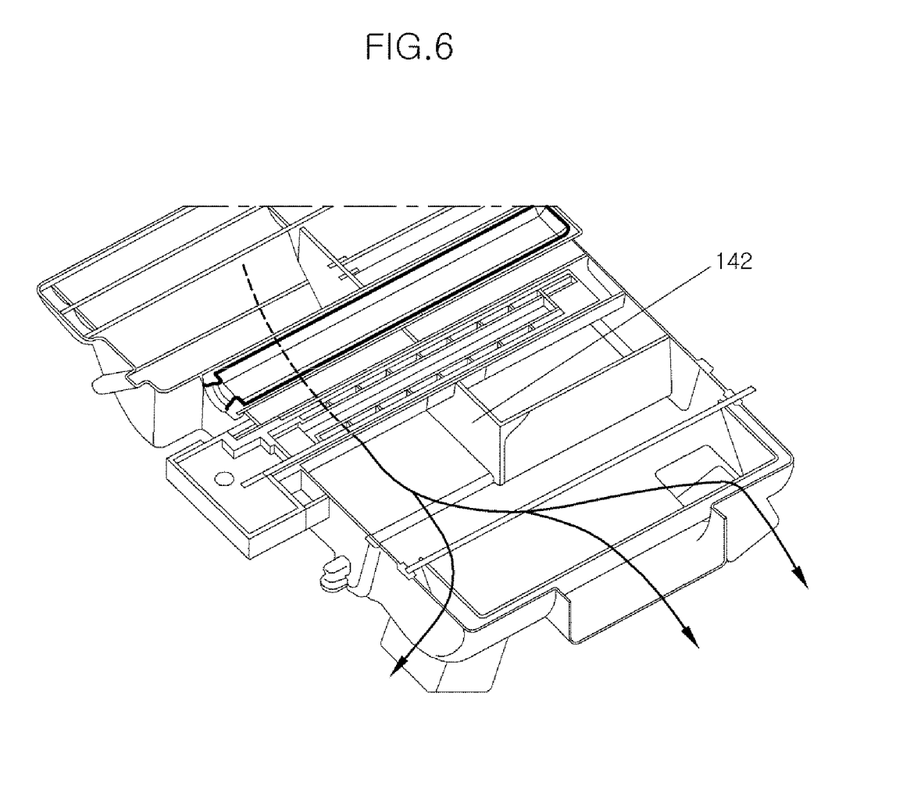
FIG. 6 illustrates a cross section taken along line C-C of FIG. 4.

FIG. 3 shows a schematic view of an HVAC apparatus for an automotive vehicle according to an exemplary embodiment of the present invention, FIG. 4 illustrates a cross section taken along line A-A of FIG. 3, FIG. 5 illustrates a cross section taken along line B-B of FIG. 4, and FIG. 6 illustrates a cross section taken along line C-C of FIG. 4.

Hereinafter, a triple-zone HVAC apparatus for an automotive vehicle according to an exemplary embodiment of the present invention will be described with reference to FIG. 3 to FIG. 6.

FIG. 3 shows a front view of the HVAC apparatus according to an exemplary embodiment of the present invention, when viewed from an air outlet side thereof.

The HVAC apparatus of the present invention is configured to allow an air blowing zone to be divided into three zones of X, Y and Z and to control the triple zones by four doors and two actuators. Therefore, since the HVAC apparatus of the present invention is configured for controlling triple zones with the number of doors and actuators reduced compared to a conventional HVAC apparatus, it is an economical HVAC apparatus.

A zone X is configured as an air blowing zone to a front seat face vent 31, a zone Y is configured as an air blowing zone to a front seat foot vent 32, and a zone Z is configured as an air blowing zone to a rear seat vent 33 while a defrost vent 34 is formed at a top portion of the HVAC apparatus.

FIG. 4 shows a cross section taken along line A-A of FIG. 3, which shows internal configuration and flow paths of the HVAC apparatus according to an exemplary embodiment of the present invention.

The HVAC apparatus according to an exemplary embodiment of the present invention blows cold air by allowing the air blowing through a blower to pass through an evaporator 110, and warm air by allowing the air blowing through the blower to pass through a temperature door and a heat exchanger 120.

By forming an upper and lower partition wall 140 configured to form flow paths for blowing air through the three zones, the air introduced into the upper side of the upper and lower partition wall 140 is blown through the defrost vent and the front seat face vent, while the air introduced into the lower side of the upper and lower partition wall is blown through the front seat foot vent and the rear seat vent.

Each of upper and lower flow paths partitioned by the upper and lower partition wall 140 is provided at the front end portion of the heat exchanger 120 with an upper temperature door 131 and a lower temperature door 132 to control the rate of air inflow into the heat exchanger 120. In addition, each of the temperature doors is provided as a pair at a driver seat side and a passenger seat side.

Blowing air through the front seat face vent is controlled by the front seat face door 150, blowing air through the front seat foot vent is controlled by the front seat foot door 160, and blowing air to the rear seat vent is controlled by the rear seat door 170.

The front seat face door 150, the front seat foot door 160, and the rear seat door 170 ventilate selectively cold air or warm air depending on whether the air passes over the heat exchanger 120.

A sub-door 180 configured for assisting blowing the air to the front seat foot vent will be described later.

FIG. 5 shows a flow path for blowing air for the zone Y as described above, and FIG. 6 shows a flow path for blowing air for the zone Z.

As can be seen in FIG. 5, the flow path of the air blowing through the front seat foot vent is formed only in one zone divided by vertically dividing the zone Y to correspond to one of a flow path to the driver seat or a flow path to the passenger seat among flow paths of the front seat face vent.

In FIG. 5, the flow path corresponding to the passenger seat is shown as an example. However, the flow path shown in FIG. 5 may be formed as the flow path corresponding to the driver seat.

A foot guide wall 141 is provided for vertical division of such flow path.

Alternatively, a closed case for the driver seat side, in which the foot guide wall 141 is integrally formed, may be separately manufactured and assembled.

As can be seen in FIG. 6, the flow path of the air blowing through the rear seat vent is also formed in only one zone divided by vertically dividing the zone Z to correspond to one of the flow path to the driver seat or the flow path to the passenger seat among flow paths of the front seat face vent.

In FIG. 6, the flow path corresponding to the driver seat is shown as an example. However, the flow path shown in FIG. 6 may be formed as the flow path corresponding to the passenger seat.

However, for an exemplary embodiment of the present invention, the flow path is formed as a flow path opposite to a flow path of the front seat foot vent.

As shown in the drawings, the flow path of the front seat foot vent corresponds to the passenger seat and the flow path of the rear seat vent corresponds to the driver seat.

Only when the above is the case, the number of actuators can be reduced.

That is, the HVAC apparatus according to an exemplary embodiment of the present invention divides upper and lower volumes to form separate mixing zones, the air in the flow path through the upper volume is blown through the defrost vent or the front seat face vent, the air in the flow path through the lower volume is blown through the front seat foot vent or the rear seat vent, the flow path and door of the front seat foot vent and the flow path and door of the rear seat vent are formed only at one side of the driver seat or the passenger seat, reducing the number of doors.

Further, by configuring the flow path of the foot vent and the flow path of the rear seat vent in the above manner, it is possible to control the flow path by a total of two actuators, one for the driver seat side and another for the passenger seat side.

As can be seen in FIG. 3, although the flow path and the door are formed only at one side, the front seat foot vent 32 and the rear seat vent 33 are formed to extend from both sides of the HVAC apparatus, so that the air can be blown to both the driver seat and the passenger seat.

However, blowing air through the front seat foot vent may be disadvantageous to separate control of the driver seat and the passenger seat.

To make up for the above deficiency, a sub-door 180 is provided.

The sub-door 180 is provided at the rear end portion of the heat exchanger 120 in the zone Y and under the front seat face vent or the front seat face door.

The air blowing through the sub-door 180 to be supplied to the driver seat and the passenger seat becomes warm air after passing through the heat exchanger 120, and passes through the sub-door 180 and communicates with the front seat foot vent 32.

In the present way, when the temperature set for the foot zone of the driver seat is different from the temperature set for the foot zone of the passenger seat, the temperature of the air blowing to the driver seat side through the front seat foot vent and the temperature of the air blowing to the passenger seat side through the front seat foot vent can be controlled differently by controlling either the sub-door at the driver seat side or the sub-door at the passenger seat side.

Figure 7:
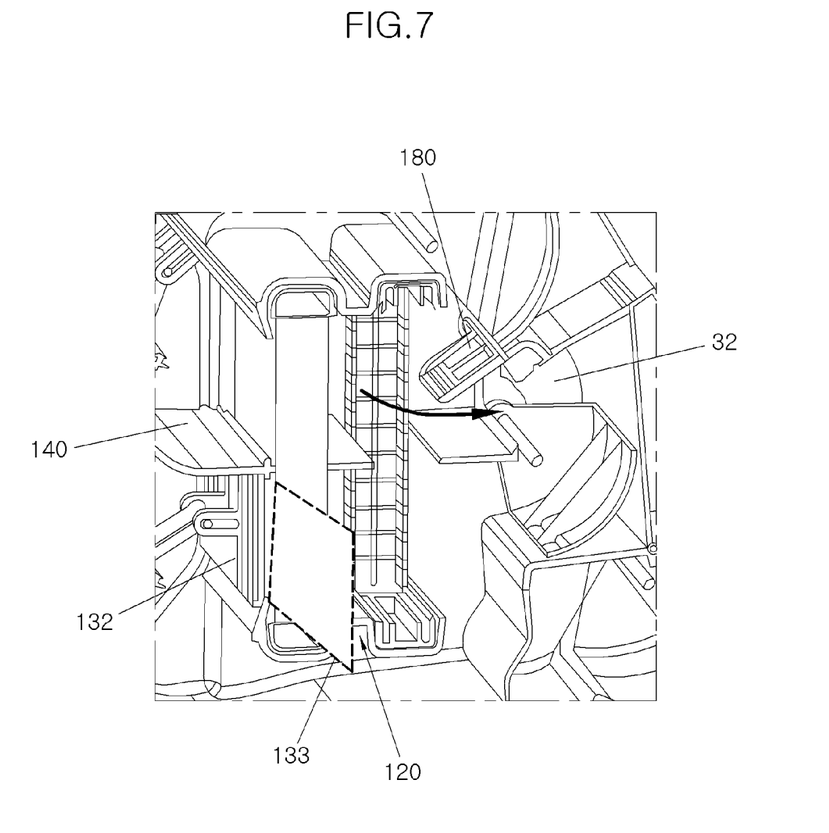
FIG. 7 is a partial enlarged view of a triple-zone HVAC apparatus for an automotive according to an exemplary embodiment of the present invention.

Specifically, referring to FIG. 7, when the temperature of the foot zone of the passenger seat is raised higher than that of the driver seat, the sub-door 180 at the passenger seat side is opened to allow warm air to be added and allow the mixed air to blow through the foot vent at the passenger seat side, regulating the temperature differently.

When the temperature of the foot zone of the passenger seat is lower than that of the foot zone of the driver seat, the sub-door at the driver seat side is opened to allow warm air to blow through the foot vent at the driver seat side wherein the temperature of the driver seat side is higher than that of the passenger seat side, and the temperature of the air blowing through both foot vents is controlled by the lower temperature door 132 at the passenger seat side and the lower temperature door 133 at the driver seat side wherein cold air is blown more to maintain the overall temperature balance.

As described above, it can be seen that the triple-zone HVAC apparatus according to an exemplary embodiment of the present invention is more efficient because it allows the triple zones to be controlled individually with the limited number of doors and actuators.

For convenience in explanation and accurate definition in the appended claims, the terms "upper", "lower", "internal", "outer", "up", "down", "upwards", "downwards", "front", "rear", "back", "inside", "outside", "inwardly", "outwardly", "internal", "external", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A triple-zone heating, ventilation and air conditioning (HVAC) apparatus for an automotive vehicle, wherein the HVAC apparatus is configured to mix cold air passing through an evaporator and warm air passing through a heat exchanger with each other and blow the mixed air to a front seat foot vent through a front seat foot door and to a rear seat vent through a rear seat door,
   wherein an upper and lower partition wall for dividing an internal volume into an upper volume and a lower volume to divide a flow path into an upper flow path and a lower flow path is formed,
   wherein the upper and lower partition wall is formed at a height at which the heat exchanger is bisected, and
   wherein flow paths to the front seat foot vent and the rear seat vent are formed in the lower volume defined by the upper and lower partition wall.

2. The triple-zone HVAC apparatus according to claim 1, wherein the front seat foot vent includes a foot vent at a driver seat side and a foot vent at a passenger seat side and wherein the flow path to the rear seat vent is disposed below the flow path to the front seat foot vent.

3. The triple-zone HVAC apparatus according to claim 2, wherein the flow path to the front seat foot vent is formed in one volume of internal volumes bisected vertically.

4. The triple-zone HVAC apparatus according to claim 3, wherein one volume among the internal volumes bisected vertically, in which a flow path to the front seat foot vent is not formed, is closed.

5. The triple-zone HVAC apparatus according to claim 3, wherein the flow path to the rear seat vent is formed in one volume of the internal volumes bisected vertically.

6. The triple-zone HVAC apparatus according to claim 5, wherein one volume among the internal volumes bisected vertically, in which a flow path to the rear seat vent is not formed, is closed.

7. The triple-zone HVAC apparatus according to claim 5, wherein the flow path to the front seat foot vent and the flow path to the rear seat vent do not overlap vertically.

8. The triple-zone HVAC apparatus according to claim 7, further including a sub-door provided in the upper flow path defined by the upper and lower partition wall to guide warm air in the upper flow path to the front seat foot vent.

9. The triple-zone HVAC apparatus according to claim 8, wherein the sub-door is disposed at a rear end portion of the heat exchanger and is provided at a lower side of a front seat face door for controlling blowing of air to the front seat face vent through the upper flow path.

10. The triple-zone HVAC apparatus according to claim 9, wherein the sub-door includes a sub-door at the driver seat side and a sub-door at the passenger seat side.

11. The triple-zone HVAC apparatus according to claim 8, wherein the sub-door includes a sub-door at the driver seat side and a sub-door at the passenger seat side.

12. The triple-zone HVAC apparatus according to claim 5, wherein the front seat foot door and the rear seat door are configured to be controlled separately by actuators provided at the driver seat side and the passenger seat side respectively.

13. A triple-zone heating, ventilation and air conditioning (HVAC) apparatus for an automotive vehicle, wherein an internal volume vertically bisected into a driver seat side and a passenger seat side and divided into upper and lower volumes is formed, a flow path to a front seat face vent is formed in the upper volume, a flow path to a front seat foot vent and a flow path to a rear seat vent are formed to be divided vertically in the lower volume, and the flow paths to the front seat foot vent and the rear seat vent are formed in one volume of the volumes bisected vertically.

14. The triple-zone HVAC apparatus according to claim 13, wherein the flow path to the front seat foot vent and the flow path to the rear seat vent do not overlap vertically.

15. The triple-zone HVAC apparatus according to claim 14, wherein a front seat foot door for controlling the flow path to the front seat foot vent and a rear seat foot door for controlling the flow path to the rear seat vent are configured to be controlled by separate actuators.

16. The triple-zone HVAC apparatus according to claim 15, further including a sub-door provided in the upper volume to guide warm air in the upper volume to the front seat foot vent.

17. The triple-zone HVAC apparatus according to claim 16, wherein the sub-door is disposed at a rear end portion of a heat exchanger provided in the upper volume and is provided at a lower side of a front seat face door for controlling blowing of air to the front seat face vent.

* * * * *